United States Patent [19]
Arnette

[11] Patent Number: 5,646,707
[45] Date of Patent: Jul. 8, 1997

[54] REMOVABLE NOSE PIECE

[75] Inventor: Gregory F. Arnette, South Laguna Beach, Calif.

[73] Assignee: Arnette Optic Illusions, Inc., San Clemente, Calif.

[21] Appl. No.: 622,463

[22] Filed: Mar. 25, 1996

[51] Int. Cl.⁶ .................................................. G02C 5/12
[52] U.S. Cl. ................................. 351/138; 351/136
[58] Field of Search ........................... 351/138, 136, 351/137, 139, 41, 65, 69, 76, 78, 79, 80

[56] References Cited

U.S. PATENT DOCUMENTS

| | | | |
|---|---|---|---|
| 2,607,919 | 8/1952 | Stegeman | 2/14 |
| 3,345,121 | 10/1967 | De Angelis | 351/130 |
| 3,476,468 | 11/1969 | Fortenberry | 351/130 |
| 3,584,939 | 6/1971 | Olson et al. | 351/132 |
| 4,131,341 | 12/1978 | Bradley, Jr. | 351/139 |
| 4,405,214 | 9/1983 | Bolle | 351/88 |
| 4,470,674 | 9/1984 | Piampiano | 351/136 |
| 4,704,015 | 11/1987 | Grendol et al. | 351/138 |
| 4,707,089 | 11/1987 | Danloup et al. | 351/138 |
| 4,732,464 | 3/1988 | Bononi | 351/138 |
| 4,951,322 | 8/1990 | Lin | 2/439 |
| 5,032,017 | 7/1991 | Bolle et al. | 351/116 |
| 5,182,586 | 1/1993 | Bennato | 351/47 |

FOREIGN PATENT DOCUMENTS 2405490  6/1979  France ......................... 351/137

*Primary Examiner*—Hung X. Dang
*Attorney, Agent, or Firm*—Stetina Brunda & Buyan

[57] ABSTRACT

An eyeglass frame having removable nose piece members detachably fastenable thereto. In one embodiment, first and second nose piece members are provided to interconnect with a dedicated one of two members formed upon the eyeglass frame. Preferably, such members formed upon the eyeglass frame comprise I-beams that depend from the bridge of the frame and extend along a portion of the perimeter of each respective lens that abut either side of the nose of the wearer. Each respective nose piece member may be selected to have a desired size, shape and contour to thus allow the wearer to selectively attach the desired nose piece members to the frame to thus achieve a desired fit.

7 Claims, 1 Drawing Sheet

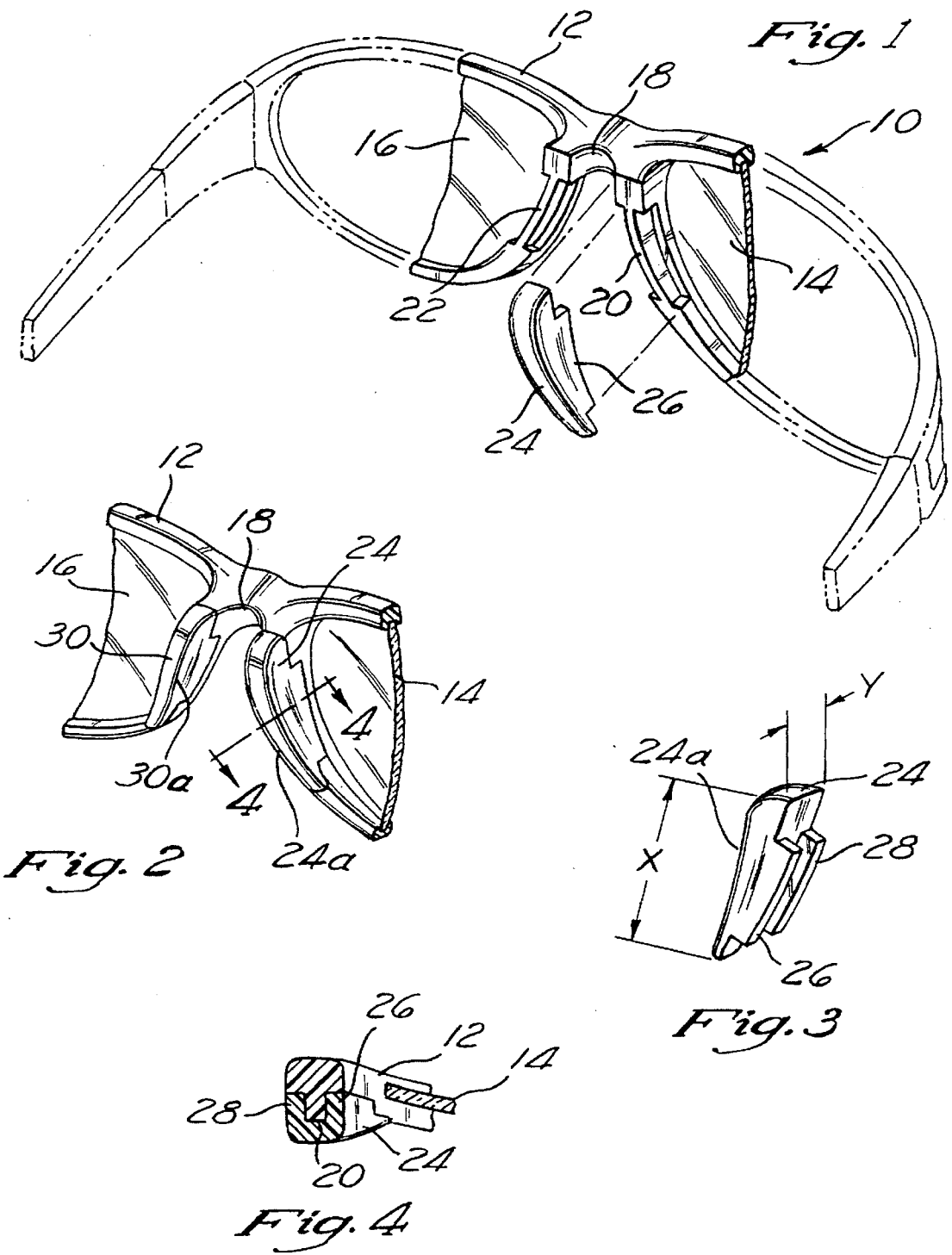

REMOVABLE NOSE PIECE

FIELD OF THE INVENTION

The present invention relates generally to adjustable eyewear, and more particularly, eyeglass and sunglass frames having removable nose pieces attachable thereto.

BACKGROUND OF THE INVENTION

Eyeglass frames, whether used to hold prescription lenses or lenses that block out the sun (i.e., sunglasses), are well-known in the art and are utilized by millions of people throughout the world. Critical to the utility of any such pair of eyeglass frames is the proper alignment of the frame, and more particularly the lens held thereby with the eyes of the wearer. In this regard, the eyeglass frame is typically provided with two (2) respective temple pieces that extend over each respective ear of the wearer, as well as nose piece members that rest upon opposed sides of the wearer's nose to thus axially position each lens within the direct line of vision of the wearer. As an alternative to providing nose piece members, such eyeglass frames merely provide a contoured bridge disposed between each respective lens that rests upon the top portion or root of the wearer's nose.

Such eyeglass frame designs, however, suffer from numerous drawbacks. With respect to eyeglass frames having nose piece members formed thereon, such members must be manipulated by a trained technician using specialized equipment to ensure that each respective nose piece member is properly positioned upon the nose of the wearer. Additionally, such nose piece members are typically connected to the frame via wires that have the potential to become bent out of position. Thus, in the event such nose rest members are bent out of position, it is necessary for the wearer to have the same re-positioned by a technician.

Eyeglass frames having nose rest portions formed as part of the bridge thereof likewise suffer from numerous drawbacks. In this regard, because the bridge, and hence nose rest portion, of the frame is integrally formed as one piece, no means exist whereby the frame may be adjusted to rest more comfortably or be more advantageously oriented upon the face of the wearer. More specifically, the frame cannot be adjusted and the wearer is left with no alternative but to be content with the fit of the frame as is. As a result, those individuals with different and/or irregularly shaped noses are substantially limited as to the type and style of eyeglass frames they can wear.

Accordingly, there is a need in the art for an eyeglass frame that may be quickly and easily adjusted to conform the face of the wearer, and more particularly the nose thereof. There is additionally a need in the art for an eyeglass frame that allows for the nose piece thereof to be selectively chosen to better conform to the face of the wearer.

SUMMARY OF THE INVENTION

The present invention specifically addresses and alleviates the above-identified deficiencies in the art. More specifically, the present invention comprises a conventional eyeglass frame in combination with at least one removable nose piece detachably fastenable thereto. In one embodiment, the invention comprises a conventional eyeglass frame in combination with two removable nose pieces attachable to the frame along a respective one of two portions formed thereon. In this regard, the frame is provided with two respective I-beam members depending from the bridge thereof that are designed and configured to receive and frictionally retain a respective nose piece member thereto. Each respective I-beam member is so formed on the frame that, when a respective nose member is attached thereto, the nose piece member is aligned with and oriented to rest upon a respective side of the root of nose of the wearer. Advantageously, each respective nose piece member may be selected to have a desired size, shape and contour to thus provide an optimal fit upon the face of the wearer.

It is therefore an object of the present invention to provide an eyeglass frame having a removable nose piece attachable thereto that allows the wearer to quickly and easily adjust the frame to thus provide an optimal fit upon the face thereof.

Another object of the present invention is to provide an eyeglass frame having removable nose piece members attachable thereto wherein each nose piece may be selected to have a desired size, shape and contour that is complimentary to the face and nose of the wearer.

Another object of the present invention is to provide an eyeglass frame in combination with removable nose piece members wherein the latter are of simple construction, easy to use, and do not require a trained technician or special tools to utilize and/or adjust the same.

A still further object of the present invention is to provide a removable nose piece that may be used in combination with all types and styles of eyeglass frees, including frames for holding prescription lenses as well as sunglasses.

BRIEF DESCRIPTION OF THE DRAWINGS

These, as well as other features of the present invention, will become more apparent upon reference to the drawings wherein:

FIG. 1 is a rear exploded view of a portion of an eyeglass frame and removable nose piece member according to a preferred embodiment of the present invention;

FIG. 2 is a rear perspective view of the portion of the eyeglass frame in FIG. 1 in combination with two respective removable nose piece members fastened thereto;

FIG. 3 is a perspective view of a removable nose piece member according to a preferred embodiment of the present invention; and FIG. 4 is a cross sectional view taken along line 4—4 FIG. 2.

DETAILED DESCRIPTION OF THE PREFERRED EMBODIMENT

Referring now to the drawings wherein the showings are for purposes of illustrating a preferred embodiment of the present invention only, and not for purposes of limiting the same, there is shown in FIG. 1 a rear exploded view of the adjustable eyewear 10 according to a preferred embodiment of the present invention. The invention 10 comprises an eyeglass frame 12 in combination with at least one detachably fastenable nose piece member 24 attachable thereto.

As is well-known in the art, conventional eyeglass frames are typically provided with nose rest members that are designed to rest upon opposed sides of the root of the nose of the wearer. Such nose rest members, however, are typically attached to the eyeglass frame by wires that need to be selectively bent by a trained technician using special tools to thus achieve the desired fit of the frame upon the face of the wearer. Alternatively, eyeglass frames, and most notably sunglasses, have a non-adjustable, pre-formed frame designed such that the bridge of the frame rests upon the glabella or root of nose of the individual. Such pre-formed frames, however, do not allow, and in fact prohibit, modification of the frame to conform to the face of the wearer.

The present invention 10 overcomes such deficiencies by allowing a wearer to quickly and easily adjust the fit of the frame 12, via removable nose piece members 24 such that the frame 12, and more particularly the lenses 14, 16 held thereby are maintained in proper orientation and alignment with respect to the eyes of the wearer. As will be recognized by those skilled in the art, eyeglass frame 12 will be of conventional construction and fabricated from materials well-known in the art. In this regard, eyeglass frame 12 and removable nose piece 24 attachable thereto may be utilized for prescription eye wear, sunglasses, safety glasses and the like. In any such application, the benefits of the present invention 10 may be readily realized and appreciated.

In a preferred embodiment, frame 12 has formed thereon first and second members 20, 22 that are designed to receive and interconnect with a respective one of two nose piece members 24, 30, as seen in FIG. 2. First and second members 20, 22 are preferably formed upon the frame 12 such that each member 20, 22 is aligned with and oriented to rest upon a respective opposed side of the root of nose of the wearer. More specifically, first member 20 is preferably formed upon the frame 12 such that member 20 depends from the bridge 18 thereof and extends along a portion of the perimeter of lens 14 such that member 20 is aligned with and rests upon the right side of the root of nose of the wearer. Similarly, second member 22 is formed such that member 22 depends from bridge 18 and extends along a portion of the perimeter of lens 16 such that member 22 is aligned with and rests upon the left side of the root of nose of the wearer.

Referring now to FIG. 3, there is shown a respective nose piece 24 utilized to interconnect with and remain frictionally retained upon a respective one of the I-beam members, namely first member 20, formed upon the frame 12. As illustrated, nose piece 24 is provided with first and second flanges 26, 28, that are designed to interconnect with and form a complimentary fit with I-beam member 20, as is more clearly seen in FIG. 4. Advantageously, nose piece member 24 may be provided with a contoured surface 24a that can be formed to have a variety of desired shapes to thus form a more complimentary fit when placed upon the nose of a given wearer. In this regard, contoured surface 24a may be formed to have a variety of angles to thus accommodate and form a complimentary fit with a wide variety of shapes and sizes of noses. Moreover, in addition to having a contoured surface 24a, nose piece 24 may also be formed to have desired widths and lengths, indicated by the letters Y and X, respectively, to further enhance the fit of the frame 12 upon the face of the wearer, as well as provide better orientation and alignment of the lens 14, 16 with the eyes of the wearer.

As such, it is contemplated that the wearer may choose among a wide variety of nose piece members to thus achieve the desired fit of the frame 12 upon the face of the wearer. It is additionally contemplated that such nose members 24, 30 may be fabricated from materials well-known in the art and therefore be produced to come in a variety of colors. Moreover, each respective nose piece member 24, 30 may be formed to have a non-slick surface to thus prevent the frame 12 from sliding down the face, and more particularly the nose, of the wearer when the frame 12 is worn.

Referring now to FIG. 2, there is shown frame 12 in combination with nose piece members 24, 30 secured thereto. As will be appreciated, nose piece members 24, 30 will each have been respectively chosen to have a desired contoured surface 24a, 30a that are most compatible with the respective sides of the root of nose of the wearer. Moreover, not only does the simple and unique interconnection between nose piece members 24, 30 and frame 12 form a more comfortable fit upon the face of the wearer, there is further provided enhanced performance of the frame 12 as nose piece members 24, 30 maintain the lens 14, 16 in ideal alignment with the eyes of the wearer.

With respect to the use of the present invention 10, the individual desiring to wear the frame will initially select first and second nose piece members 24, 30 to be interconnected with the frame 12. As discussed above, it is contemplated that the wearer will be able to select among a variety of nose piece members having a variety of shapes, contours and sizes. Once selected, each nose piece member 24, 30 is manually fastened to the frame 12. As illustrated in FIG. 1, the individual need only align and interconnect flanges 26, 28 of member 24 with I-beam member 20 such that the interconnection as shown in FIG. 4 is formed. As is apparent, contoured surface 24a will therefore be oriented and configured to rest upon the right side of the root of nose of the wearer. The identical procedure is carried out with respect to the interconnection of the second nose piece member 30 with I-beam member 22.

When in this configuration, as illustrated in FIG. 2, the frame 12 may be worn as would a typical eyeglass frame. Should the wearer desire to change the fit of the frame 12, he or she need only remove a respective one or both of the nose piece members 24, 30 and replace the same with a nose piece member or members having a different size, contour and/or shape.

There has thus been provided a selectively adjustable eyeglass frame having removable nose pieces attachable thereto. It should be understood that additionally modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. An eyeglass frame comprising:

a) a frame member having a nose accommodation space formed by a left wall thereof and an opposing right wall thereof, with at least a portion of each of said walls configured as an I-beam extending proximally; and b) a left nose piece and a right nose piece each having a distal channel within which a respective I-beam can be releasably secured to thereby fasten the nose pieces to the left wall and right wall, respectively, of the frame member, with each nose piece having a generally smooth shape and contour generally complimentary to a shape and contour of a nose of a wearer of the eyeglass frame such that the left nose piece rests against a left side of the nose and the right nose piece rests against a right side of said nose.

2. An eyeglass frame as claimed in claim 1 wherein at least respective portions of the left wall and the right wall curve laterally in a direction away from each other, with each proximally extending I-beam likewise curving laterally in a direction away from the other I-beam and with each distal channel of each nose piece curved laterally to accommodate a respective I-beam.

3. An eyeglass frame as claimed in claim 2 wherein the right nose piece and left nose piece are of different lengths.

4. An eyeglass frame as claimed in claim 3 wherein the right nose piece and left nose piece are of different widths.

5. An eyeglass frame as claimed in claim 1 wherein the right nose piece and left nose piece are of different lengths.

6. An eyeglass frame as claimed in claim 1 wherein the right nose piece and left nose piece are of different widths.

7. An eyeglass frame as claimed in claim 1 wherein at least one of the right and left nose pieces is formed to have a non-skid outer surface.

* * * * *